(No Model.)
J. J. KENNELLY.
FENDER FOR STREET CARS.
No. 532,969. Patented Jan. 22, 1895.
FIG: 1
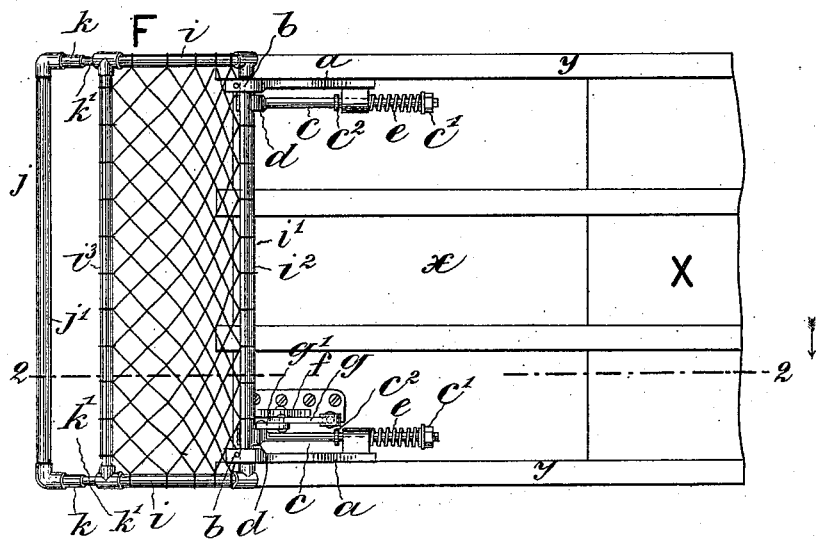
FIG: 2.
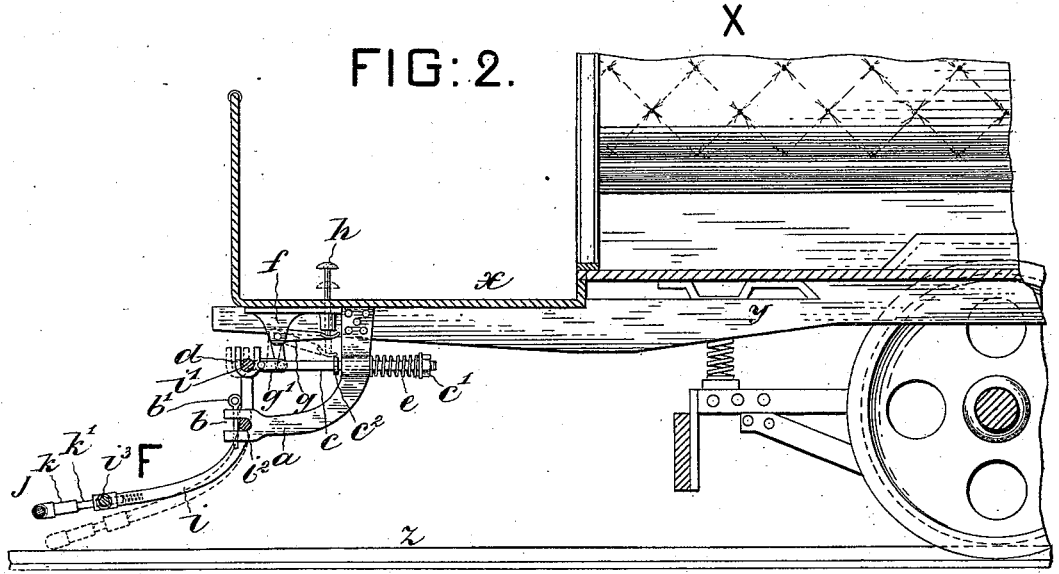
FIG: 3.
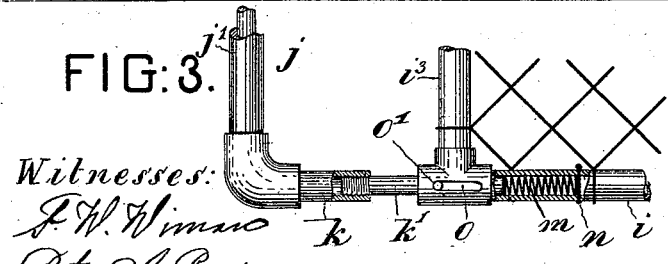
Witnesses:
Inventor:
John J. Kennelly
by Henry Connett
his Attorney

UNITED STATES PATENT OFFICE.

JOHN J. KENNELLY, OF NEW YORK, N. Y., ASSIGNOR OF ONE-HALF TO JOHN B. BENTON, OF SAME PLACE.

FENDER FOR STREET-CARS.

SPECIFICATION forming part of Letters Patent No. 532,969, dated January 22, 1895.

Application filed April 25, 1894. Serial No. 508,914. (No model.)

*To all whom it may concern:*

Be it known that I, JOHN J. KENNELLY, a citizen of the United States, residing in the city, county, and State of New York, have invented certain new and useful Improvements in Fenders for Street-Cars, of which the following is a specification.

My invention relates to the class of devices to be employed on trolley cars, cable cars, and the like to prevent the car from running over a person on the track, and the object is to provide a fender which may be shifted from one end to the other of the car and thus avoid the necessity of providing one for each end of the car, and one which may be depressed into operative position by the motorman or gripman when occasion requires. Means are also provided for cushioning the blow when the fender strikes an object.

The invention will be fully described hereinafter and its novel features carefully defined in the claims.

In the accompanying drawings I have illustrated an embodiment of my invention.

Figure 1 is an under side view of the bottom of a car provided with my improved fender. The view shows but one end of the car. Fig. 2 is a vertical, longitudinal section taken in the plane of the line 2, 2, in Fig. 1. Fig. 3 is an enlarged detail view illustrating the cushioning device of the fender.

As both ends of a car of this class are alike and the car is adapted to run, shuttle fashion, with either end foremost, only one end of such a car is shown in the principal figures.

X represents the car-body and $x$ the platform at one end thereof. To the faces of two of the car sills, $y$, are secured two brackets $a$, $a$, each of which has a forked or open bearing, $b$, at its forward end; and mounted in sliding bearings in these brackets are rods, $c$, which also have forked bearings, $d$, in their forward ends. On each rod $c$, back of the bracket $a$, is a spring, $e$. Back of the spring, on the rod, is a nut or collar, $c'$, to serve as an abutment for the spring $e$, and at the front of the bracket, on the rod, is a stop-collar, $c^2$. Under the car-platform, at one side, is secured a bearing piece or block, $f$, in which is fulcrumed an elbow-lever, $g$, the pendent arm of which is coupled to the spring-rod $c$, by a short link, $g'$; and over the horizontal arm of the lever $g$, is mounted in a sliding bearing, a push-pin, $h$, which projects up above the car-platform and has a rounded head, or the like, to receive the foot of the operator.

The mechanism as above described forms a fixture of the car and each end of the car will be furnished with such a mechanism to receive, support and operate the removable fender, which will now be described.

I prefer to make the fender—which is designated as a whole, by the letter F,—of metal tubing, such as gas pipe, the parts being united by the usual fittings. This fender is composed in the main of two curved side-bars, $i$, $i$, and three transverse bars, $i'$, $i^2$, $i^3$. The frame of the fender will be covered by some suitable material, such as wire netting, for example. At its front end the fender has a cushioning device comprising a transverse bar, $j$, and two short side-bars, $k$, $k$. These side-bars have each a tenon, $k'$, as best seen in Fig. 3, which enters and plays in the side-bar $i$, at the side. In the hollow of the bar $i$, is a cushion spring, $m$, against which the tenon $k'$, bears, said spring abutting at its inner end against a stop, $n$, fixed in the bar $i$. To limit the outward movement of the tenon under the pressure of the spring some form of limiting stop will be provided. As shown in Fig. 3 a slot, $o$, is formed in the side-bar $i$, and a pin or stud, $o'$, set in the tenon $k'$, plays in said slot.

The upper transverse bar, $i'$, of the fender rests in the forked bearings in the spring-rods $c$, and the transverse bar $i^2$, rests in the forked bearings $b$, in the J-shaped brackets $a$, wherein it is held by pins or split keys, $b'$.

Normally the springs $e$, by drawing back the upper part of the fender, (above the fulcrum in the bearings $b$,) holds the front end of the fender up from the track, $z$, high enough to allow for the swaying of the car-body on its springs; but when the motorman depresses the push-pin $h$, the latter rocks the elbow-lever $g$, and through its connection with one of the spring-rods $c$, drives forward the upper part of the fender and depresses its forward, cushioned end to the level of the track, as indicated in dotted lines in Fig. 2, thus putting the fender in position to take under and scoop up any body on the track. When the pin $h$, is relieved of pressure the springs $e$, return the fender to its normal position.

The function of the cushion at the front of the fender is to modify the effect of the blow on the body and avoid, in a degree, material injury therefrom.

When the car reaches the end of the route, the fender—which will be comparatively light and convenient to handle—is removed by withdrawing the pins $b'$, and lifting it from its bearings. It is then mounted in the bearings at the other end of the car.

I do not wish to limit myself to the details of construction herein shown as these may be varied to some extent without departing materially from my invention. For example any known means may be employed for operating the fender to depress it from the platform of the car. The short bars $k$, might also telescope with the bars $i$, and the tenons $k'$, be omitted.

The transverse bar $j$, will preferably be composed of a round bar or tube over which is slipped somewhat loosely a tube $j'$, of rubber, or rather of rubber and canvas, such as rubber hose. The object of this is partly to cushion or soften the blow and partly to serve as a roller should the fender be lowered so as to strike the rails or the paving between them.

Having thus described my invention, I claim—

1. The combination with a car provided at both ends with forked, open brackets $a$, and keys $b'$, of an interchangeable fender F, provided with fulcrum journals $i^2$, which find bearings in the open brackets, and means carried by the car for rocking said fender on its fulcrum, as set forth.

2. The combination with a car provided with forked bearing brackets at both ends, of an interchangeable fender F, having fulcrum journals $i^2$, and a bar $i'$, at its upper end, spring rods carried by the car and provided with U-shaped front ends to engage the bar $i'$, the springs on said rods, and means, mounted on each end of the car for operating said spring rods, substantially as set forth.

3. The combination with a car provided at each end with brackets $a$, having open bearings $b$, spring-rods $c$, having open bearings $d$, springs $e$ on said rods, and means substantially as described for driving forward one of said rods at each end of the car, of a fender F, having transverse bars to rest in the respective bearings $b$ and $d$, substantially as set forth.

4. The combination with a car provided with forked fulcrum bearings for a removable rocking fender, the said fender mounted in said forked bearings, a spring on the car for holding said fender in its normally elevated position, and means, carried on the car platform, for depressing said fender into its operative position, substantially as set forth.

5. The combination with the brackets on the car provided with forked fulcrum bearings for a removable rocking fender, and the fender mounted in said bearings, of the spring-rods $c$, coupled removably to forks on the upper part of the fender, the springs $e$ on said rods, the elbow-lever $g$, mounted on the car, the link $g'$, coupling one arm of said lever to a spring-rod, and the push-pin $h$, bearing on the other arm of said elbow-lever, substantially as set forth.

In witness whereof I have hereunto signed my name in the presence of two subscribing witnesses.

JOHN J. KENNELLY.

Witnesses:
HENRY CONNETT,
PETER A. ROSS.